(12) United States Patent
Laskowski et al.

(10) Patent No.: US 10,889,692 B2
(45) Date of Patent: Jan. 12, 2021

(54) TRIBLOCK COPOLYMERS

(71) Applicant: 3M INNOVATIVE PROPERTIES COMPANY, St. Paul, MN (US)

(72) Inventors: Carl A. Laskowski, Minneapolis, MN (US); Timothy M. Gillard, St. Paul, MN (US); Michelle M. Mok, St. Paul, MN (US); Lucas D. McIntosh, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/477,741

(22) PCT Filed: Feb. 13, 2018

(86) PCT No.: PCT/US2018/017908
§ 371 (c)(1),
(2) Date: Jul. 12, 2019

(87) PCT Pub. No.: WO2018/152075
PCT Pub. Date: Aug. 23, 2018

(65) Prior Publication Data
US 2019/0359778 A1 Nov. 28, 2019

Related U.S. Application Data

(60) Provisional application No. 62/460,133, filed on Feb. 17, 2017.

(51) Int. Cl.
*C08J 5/18* (2006.01)
*C08F 297/00* (2006.01)
*C08G 81/02* (2006.01)

(52) U.S. Cl.
CPC ......... *C08G 81/027* (2013.01); *C08G 81/025* (2013.01); *C08J 5/18* (2013.01); *C08J 2387/00* (2013.01)

(58) Field of Classification Search
CPC .......................... C08F 297/048; C08L 53/025
See application file for complete search history.

(56) References Cited

U.S. PATENT DOCUMENTS

| | | |
|---|---|---|
| 3,333,024 A | 7/1967 | Haefele |
| RE27,145 E | 6/1971 | Jones |
| 3,971,373 A | 7/1976 | Braun |
| 4,039,593 A | 8/1977 | Kamienski |
| 4,100,324 A | 7/1978 | Anderson |
| 4,429,001 A | 1/1984 | Kolpin |
| 4,874,818 A | 10/1989 | Yamamoto et al. |
| 5,145,727 A | 9/1992 | Potts |
| 5,149,576 A | 9/1992 | Potts |
| 5,321,148 A | 6/1994 | Schwindeman |
| 5,352,744 A | 10/1994 | Bates |
| 5,612,422 A | 3/1997 | Hucul |
| 5,645,253 A | 7/1997 | Hoshino |
| 5,700,878 A | 12/1997 | Hucul |
| 6,160,054 A | 12/2000 | Schwindeman |
| 6,184,338 B1 | 2/2001 | Schwindeman |
| 6,197,891 B1 | 3/2001 | Schwindeman |
| 6,221,991 B1 | 4/2001 | Letchford |
| 7,144,952 B1 | 12/2006 | Court et al. |
| 2008/0171828 A1 | 7/2008 | Bening |
| 2011/0046308 A1 | 2/2011 | Sawaguchi |
| 2012/0238652 A1 | 9/2012 | Uehara et al. |
| 2014/0360975 A1 | 12/2014 | Hustad |
| 2020/0047135 A1* | 2/2020 | Mok ................... C08F 297/046 |

FOREIGN PATENT DOCUMENTS

| | | |
|---|---|---|
| EP | 0260799 | 3/1988 |
| WO | WO 2000-056782 | 9/2000 |

OTHER PUBLICATIONS

Cohen, "Cobalt Catalysts for the Alternating Copolymerization of Propylene Oxide and Carbon Dioxide: Combining High Activity and Selectivity", Journal of the American Chemical Society, Aug. 2005, vol. 127, No. 31, pp. 10869-10878.

Falk, "Lithium Based Coordination Catalysts for the Hydrogenation of Diene and Vinylaromatic Polymers", Die Makromolekulare Chemie (The Macromolecular Chemistry), Feb. 1972, vol. 160, pp. 291-299.

Greene, Protective Groups in Organic Synthesis, Second Edition, 41, (1991).

Greene, Protective Groups in Organic Synthesis, Second Edition, 80-83, (1991).

Hanley, "Phase Behavior of a Block Copolymer in Solvents of Varying Selectivity," Macromolecules, 2000, vol. 33, No. 16, pp. 5918-5931.

Hsieh, Anionic Polymerization: Principles and Practical Applications, 93-127 (1996).

Hsieh, Anionic Polymerization: Principles and Practical Applications, 641-684 (1996).

Kawakami, "Silicone Macromers for Graft Polymer Synthesis", Polymer Journal, Nov. 1982, vol. 14, No. 11, pp. 913-917.

Kawakami, "Synthesis and Copolymerization of Polysiloxane Macromers", ACS Polymer Preprints, Apr. 1984, vol. 25, No. 1, pp. 245-246.

Kawakami, "Synthesis of Silicone Graft Polymers and a Study of Their Surface-Active Properties", Macromolecular Chemistry and Physics, Jan. 1984, vol. 185, No. 1, pp. 9-18.

(Continued)

*Primary Examiner* — Jeffrey C Mullis

(57) ABSTRACT

Described is a triblock copolymer of the formula ABC wherein B is a hydrogenated vinyl aromatic block having a $T_g$ of $\geq 110°$ C. and comprising 30-90 wt. % of the copolymer; C is a rubbery block having a $T_g \leq 25°$ C. and comprising 10-70 wt. % of the copolymer; and A is an block derived from ring-opening polymerization, substantially incompatible with both B and C blocks.

20 Claims, No Drawings

(56) References Cited

OTHER PUBLICATIONS

Ndoni, "Laboratory-Scale Setup for Anionic Polymerization under Inert Atmosphere", Review of Scientific Instruments, Feb. 1995, vol. 66, No. 2, pp. 1090-1095.
Peinemann, Asymmetric Superstructure Formed in a Block Copolymer via Phase Separation, Nature Materials, Dec. 2007, vol. 6, pp. 992-996.
Su, "Ring-Opening Polymerization". In: Principles of Polymer Design and Synthesis. Lecture Notes in Chemistry, 2013, vol. 82, Springer Berlin Heidelberg, pp. 267-299.
Wente, "Manufacture of Super Fine Organic Fibers," Report No. 4364 of the Naval Research Laboratories, May 1954, 19 pages.
Wente, "Superfine Thermoplastic Fibers," Industrial Engineering Chemistry, 1956, vol. 48, pp. 1342-1346.
International Search Report for PCT International Application No. PCT/US2018/017908, dated May 16, 2018, 4 pages.

\* cited by examiner

TRIBLOCK COPOLYMERS

CROSS REFERENCE TO RELATED APPLICATIONS

This application is a national stage filing under 35 U.S.C. § 371 of PCT/US2018/017908, filed Feb. 13, 2018, which claims the benefit of Provisional Application No. 62/460,133, filed Feb. 17, 2017, the disclosure of which is incorporated by reference in its/their entirety herein.

BACKGROUND

Materials possessing features with length scales on the order of 10-200 nm are of interest due to their potential impact in lithography, charge-carrying membranes and filtration. Block copolymers—polymers which contain discrete monomer domains—have been shown to be capable of self-assembling to yield materials with these desirable features. Spherical, cylindrical, lamellar and gyroid morphologies may be obtained from block copolymers with differences in self-assembly dependent on total molecular weight, block composition, degree of polymerization of the individual blocks, and annealing procedures.

Block copolymers have been investigated for applications involving incompatible interfaces. These include use in primers and tie-layers in multilayer films. Their potential benefit lies in the ability of block copolymers to form a covalently-bound junction between two otherwise immiscible surfaces. In commercial applications, block copolymer primers are most commonly segmented block copolymers prepared from condensation polymerization methodologies. Similarly, block copolymers may be used as dispersants as a more polar, functionalized block can interact with inorganic particles while a non-polar block serves to solubilize the composite material.

Blending of block copolymers into other polymeric compositions can result in improved properties of the final material. This technique has been used for toughening of otherwise brittle coatings, such as impact modifiers for epoxy resins. Additional bulk characteristics that can be influenced through the use of block copolymers include modification of rheology and use as compatibilizers.

In addition to application in the bulk, block copolymers have found use in solution-based processes. Amphiphilic block copolymers readily form micelle structures in select solvents, where the identity of the polymer and solvent play a crucial role in determining the structure formed (as in Bates et. al, Macromolecules, 2000, 33, 5918). Micelle formation can be exploited for such applications as drug delivery where the micelles are "loaded" with small molecule therapeutics. Solution reaction vessels may also be constructed from select block copolymers for purposes such as emulsion polymerization. Crosslinking of solution-derived micelles can be accomplished chemically or photolytically to afford polymeric nanoparticles.

Filtration materials based on block copolymers are of particular interest. Recently, the combination of solvent induced phase separation (SIPS) with block copolymer materials has been shown to yield membranes with unique isoporous morphologies and consequent high flux. K. V. Peinemann et. al., (Nature Materials, 2007, vol. 6, pg. 992) described isoporous membranes formed from diblock poly(styrene-b-vinylpyridine) (SV) copolymers. These materials have enjoyed success due to their ability to (1) form micelles with a diameter of 10 s of nm, (2) their solubility characteristics in a handful of water-miscible solvents, and (3) their ability to be synthesized in a straightforward fashion through anionic polymerization. However, the use of SV in the commercial production of a filtration membrane is highly unlikely due to a number of factors. The brittle nature of the cast membranes limits their tolerance to bending and handling. Additionally, their synthesis requires the use of temperatures below −70° C., making scale-up exceptionally challenging.

The self-assembly of block copolymers has been an area of focus by academic and industrial organizations. A large majority of this work has been the evaluation of thermally annealed dense films. An alternative means for producing periodic structures is to kinetically trap block copolymer assemblies. Such a process is exemplified by the combination of block copolymers with the SIPS process. Periodic pores obtained from this process are kinetically trapped and their structure will likely further evolve upon application of heat above the glass transition of the corresponding block copolymer units. The consequence of heat tolerance becomes particularly relevant with articles that are required to undergo sterilization through autoclave.

SUMMARY

Novel triblock polymers of the formula ABC are provided wherein B is a hydrogenated block derived from a glassy aromatic having a $T_g$ of >110° C.; C is a rubbery block having a $T_g$<25° C.; and A is a block incompatible with the B and C blocks. The triblock copolymers have a $M_n$>60 kDa and is preferably 60-500 kDa. These polymers display a unique combination of solution self-assembly and film mechanical properties. Specifically, in solution they can form micelles greater than 30 nm and when formed into films (or cast as membranes) they display significant improvements in thermal tolerance relative to unhydrogenated triblock copolymer materials of similar total molecular weight.

This invention also relates to polymer compositions comprising the triblock copolymer and shaped articles made therefrom.

Efforts to increase temperature tolerances of block copolymer structures are hampered by the lack of materials with a high $T_g$. Commonly, anionic polymerization of α-methylstyrene and tert-butylstyrene yield high $T_g$ polymers. However, both materials have limitations that affect the convenience of their synthesis. The reversibility of α-methylstyrene polymerization at ambient temperatures limits total conversion of this monomer, making block copolymer synthesis challenging. Tert-butylstyrene is often contaminated with para-ethyl(tert-butyl)styrene, which acts as a chain transfer agent affecting the dispersity of poly(tert-butylstyrene) obtained from anionic polymerization.

To overcome these limitations, applicants provide a block copolymer containing a high $T_g$ segment by the hydrogenation of vinyl aromatic block copolymers. In this process, a block copolymer containing a vinyl aromatic domain is prepared through anionic polymerization and then fully or partially hydrogenated in a second step to yield poly(cyclohexylethylene) (PCHE) or appropriately substituted PCHE copolymers. This synthetic scheme utilizes the convenience of anionic polymerization with styrene while generating a block copolymer with a $T_g$ of up to 145° C.

This disclosure describes the synthesis of amphiphilic ABC triblock copolymer materials. The central "B" block of the triblock is comprised of a fully or partially hydrogenated vinyl aromatic block to provide high $T_g$ PCHE blocks. While temperature tolerance can be added with the incorporation of PCHE-containing block, brittle materials are a consequence with deceasing polymer molecular weight. Simple PCHE-containing diblocks are likely too brittle to be used in applications other than lithography. To increase the toughness, a low $T_g$ "C" block exemplified by poly(ethylene-alt-propylene), poly(ethylene), poly(ethylene-co-butylene), or poly(butylene) is incorporated within the range to 10 to 40 mass percent. Additional phase-separation behavior is realized through the incorporation of an immiscible H-bonding "A" block, such as poly(D,L,D/L-lactide), poly(ethyleneoxide), or poly(propylenecarbonate). Together, these substituents form tough materials that phase separate and are stable to temperatures above 110° C.

Methods of preparing the triblock copolymers are described comprising the steps of a) anionically polymerizing the C block monomer, b) polymerizing the B block monomer, c) end capping the resulting copolymer with ethylene oxide to produce a copolymer of the formula CB—OH, d) hydrogenating the CB—OH block copolymer, and e) further polymerizing the copolymer of step d) with a ring-opening polymerizable monomer to produce the desired CBA block copolymer.

Alternatively, the triblock copolymers may be prepared by the steps of a) anionically polymerizing the B block monomer using a functionalized initiator to produce an intermediate block copolymer of the formula B—OR, b) polymerizing the C block monomer to produce an intermediate block copolymer of the formula CB—OR, c) terminating the polymerization, d) hydrogenating the CB—OR block copolymer, and e) deprotecting to OR group and further polymerizing the copolymer of step d) with a ring-opening polymerizable monomer.

DETAILED DESCRIPTION

Novel triblock polymers of the formula ABC are provided wherein B is a hydrogenated block derived from a glassy aromatic having a $T_g$ of >110° C.; C is a rubbery block having a $T_g$<25° C.; and A is a block incompatible with the B and C blocks. The triblock copolymers have a $M_n$>60 kDa and is preferably 60-500 kDa. The triblock copolymers desirably have a polydispersity (PDI) of 1 to 5, preferably 1 to 3, more preferably 1 to 2.

The "B" block of the copolymer comprises polymeric units that form hard, glassy domains upon polymerization and hydrogenation, with the hydrogenated B block having a $T_g$ of at least 110° C., preferably at least 115° C., and more preferably at least 130° C. The B block polymer domain comprises a total of 30 to 80 weight percent of the triblock copolymer.

The glassy B blocks are typically selected from fully or partially hydrogenated vinyl aromatic monomers and include hydrogenated products of styrene, α-methylstyrene, 4-methyl styrene, 3-methyl styrene, 4-ethyl styrene, 3,4-dimethyl styrene, 2,4,6-trimethylstyrene, 3-tert-butyl-styrene, 4-tert-butylstyrene, 4-methoxystyrene, 4-trimethylsilylstyrene, 2,6-dichlorostyrene, vinyl naphthalene, 4-chlorostyrene, 3-chlorostyrene, 4-fluorostyrene, 4-bromostyrene, vinyl toluene, ethylstyrene, diethyl styrene, di-n-butylstyrene, isopropylstyrene, other alkylated-styrenes, styrene analogs, and styrene homologs such as vinyl naphthalene, and vinyl anthracene. On full hydrogenation, the resulting blocks may be considered poly(cyclohexylethyl) blocks. It will be understood that the hydrogenation of the copolymer may partially hydrogenate the B blocks leading to a mixture of poly(cyclohexylethyl) and poly(vinyl aromatic) blocks, such as poly(styrene).

The nature and composition of the monomers which make up the individual C block is not particularly critical so long as the polymerized monomers provide a phase which meets the glass temperature requirement and, thus, can be described as "soft" or "rubbery." These terms are used interchangeably throughout the specification. It will be understood that "amorphous" blocks contain no or negligible amounts of crystallinity.

In particular embodiments, each block C is independently selected from the group consisting of polymerized (i) conjugated diene monomers, or (ii) a silicon polymer, and (iii) mixtures of monomers wherein segments containing polymerized conjugated diene monomers are fully or partially hydrogenated. Suitable conjugated dienes include, e.g., butadiene, isoprene, and the like, as well as 1,3-cyclodiene monomers, such as 1,3-cyclohexadiene, 1,3-cycloheptadiene and 1,3-cyclooctadiene, preferably 1,3-cyclohexadiene. When the C blocks of conjugated acyclic dienes such as butadiene or mixtures thereof are optionally hydrogenated, such blocks should have a vinyl content of from 0 to 40 mole percent post hydrogenation. C blocks resulting from hydrogenation include, but are not limited to, poly(ethylene-alt-propylene), poly(butylene), poly(ethylene-co-butylene), and poly(ethylene-co-propylene-co-butylene).

Additionally, the C blocks may be polymer blocks of silicon rubber segments, i.e., blocks of organopolysiloxanes having recurring units of —[Si($R^{10}$)$_2$—O]— wherein each $R^{10}$ denotes an organic radical, e.g., alkyl, cycloalkyl or aryl. Such blocks of organopolysiloxanes may be prepared by anionic polymerization of cyclic siloxanes of the general formula —[Si($R^{10}$)$_2$—O]$_r$—, where subscript r is 3 to 7. Cyclic siloxanes where subscript r is 3 or 4, and $R^{10}$ is methyl are preferred. Anionic polymerization of hexamethylcyclotrisiloxane monomer is generally described in Y. Yamashita et al. (for example, in Polymer J. 14, 913 (1982); ACS Polymer Preprints 25 (1), 245 (1984); Makromol. Chem. 185, 9 (1984)).

Additionally, each of such blocks C may have a number average molecular weight of from about 1,000 to 200,000 and may have a glass transition temperature, $T_g$, of ≤25° C., preferably ≤0° C. The combined B and C blocks comprise 70 to 95 weight percent of the triblock polymeric units. Generally the B blocks of the copolymer comprise between 30 and 90 wt. % of the copolymer, preferably about 60 to 90 wt. %. The soft "C" block comprises a total of 10 to 70 weight percent, preferably 10 to 40 wt. % of the copolymer. In some preferred embodiments the weight ratio of the B block to the C block is about 2:1+/−20%.

The A blocks comprise a copolymer block immiscible in the B and C blocks with the A blocks comprising 5 to 30 wt. % of the triblock copolymer. The immiscible component of the copolymer shows multiple amorphous phases as determined, for example, by the presence of multiple amorphous glass transition temperatures using differential scanning calorimetry or dynamic mechanical analysis. As used herein, "immiscibility" refers to polymer components with limited solubility and non-zero interfacial tension, that is, a blend whose free energy of mixing is greater than zero: $\Delta G \cong \Delta H_m > 0$.

Miscibility of polymers is determined by both thermodynamic and kinetic considerations. Common miscibility predictors for non-polar polymers are differences in solubility parameters or Flory-Huggins interaction parameters. For polymers with non-specific interactions, such as polyolefins, the Flory-Huggins interaction parameter can be calculated by multiplying the square of the solubility parameter difference with the factor (V/RT), where V is the molar volume of the amorphous phase of the repeated unit, R is the gas constant, and T is the absolute temperature. As a result, the Flory-Huggins interaction parameter between two non-polar polymers is always a positive number.

The A blocks are derived from ring-opening anionic polymerization of cyclic monomers or dimers selected from oxiranes (epoxides) to produce polyethers, cyclic sulfides to produce polythioethers, lactones and lactides to produce polyesters, cyclic carbonates to produce polycarbonates, lactams to produce polyamides and aziridines to produce polyamines. Polycarbonates may also be prepared by metal-catalyzed polymerization of carbon dioxide with epoxides listed previously (as described in Journal of the American Chemical Society, 2005, pg. 10869). The A blocks may have a linear or branched structure.

Useful epoxides include $C_2$-$C_{10}$, preferably $C_2$-$C_4$ alkyl epoxides as well as $C_2$-$C_{10}$, preferably $C_3$-$C_6$ glycidyl ethers. In particular methylglycidylether, ethylglycidylether, allylglycidylether, ethylethoxy-glycidyl ether, ethylene, propylene, and butylene oxides. Another useful epoxide is glycidol, which can provide branched A blocks.

Suitable lactones and lactams are those having 3 to 12 carbon atoms in the main ring and are of the general formula:

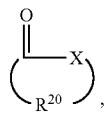

wherein
$R^{20}$ is an alkylene moiety that may be linear or branched having 1 to 20 carbon atoms, preferably 1 to 12 carbon atoms optionally substituted by catenary (in-chain) oxygen atoms, carbonyls or carboxylates; and X is —O— or —$NR^1$—, where $R^1$ is $C_1$-$C_4$ alkyl. It will be appreciated that the cyclic lactones are derived from hydroxy acids including 3-hydroxybutyrate, 4-hydroxybutyrate, 3-hydroxyvalerate, lactic acid, 3-hydroxypropanoate, 4-hydropentanoate, 3-hydroxypentanoate, 3-hydroxyhexanoate, 3-hydroxyheptanoate, 3-hydroxyoctanoate, dioxanone, valerolactone, caprolactone, and glycolic acid. The lactams are derived from the corresponding aminoacids. Dimers of the hydroxy acids, such as lactide may be used.

Useful lactams include 2-pyrrolidone, 2-piperidone, caprolactam, lauryllactam and mixtures thereof.

Useful cyclic carbonates include 5-membered to 7-membered cyclic carbonates. In embodiments, cyclic components comprise trimethylene carbonate, neopentyl glycol carbonate, 2,2,4-trimethyl-1,3-pentanediol carbonate, 2,2-dimethyl-1,3-butanediol carbonate, 1,3-butanediol carbonate, 2-methyl-1,3-propanediol carbonate, 2,4-pentanediol carbonate, 2-methyl-butane-1,3-diol carbonate, ethylene carbonate, and propylene carbonate.

Suitable cyclic anhydrides include, but are not limited to, aliphatic dicarboxylic anhydrides, such as, succinic anhydride, glutaric anhydride, maleic anhydride and combinations thereof.

Example of aziridine monomers comprise aziridine and its alkyl-substituted homologues.

Suitable cyclic ethers include 5-membered to 7-membered cyclic ethers. Reference to suitable ring-opening polymerizable monomers may be found in Frisch, Kurt Charles; Reegan, Sidney L; Ring-opening, polymerization: Kinetics and mechanisms of polymerization, Dekker Publishing, NY; 1969 and in Su, Wei-Fang, Ring-Opening Polymerization in Principles of Polymer Design and Synthesis; Springer Berlin Heidelberg, pp. 267-299, 2013.

Anionic polymerizations and copolymerizations include one or more polymerization initiators. Initiators compatible with the monomers of the instant copolymers are summarized in Hsieh et al., Anionic Polymerization: Principles and Practical Applications, Ch. 5, and 23 (Marcel Dekker, New York, 1996). The initiator can be used in the polymerization mixture (including monomers and solvent) in an amount calculated on the basis of one initiator molecule per desired polymer chain. The lithium initiator process is well known and is described in, for example, U.S. Pat. No. 4,039,593 and Re. 27,145.

Suitable initiators include alkali metal hydrocarbons such as alkyl or aryl lithium, sodium, or potassium compounds containing up to 20 carbon atoms in the alkyl or aryl radical or more, preferably up to 8 carbon atoms. Examples of such compounds are benzylsodium, ethylsodium, propylsodium, phenylsodium, butylpotassium, octylpotassium, benzylpotassium, benzyllithium, methyllithium, ethyllithium, n-butyllithium, sec-butyllithium, tert-butyllithium, phenyllithium, and 2-ethylhexyllithium. Lithium compounds are preferred as initiators.

Molecular weight is determined by the initiator/monomer ratio, and thus the amount of initiator may vary from about 0.0001 to about 0.2 mole of organometallic initiator per mole of monomer. Preferably, the amount will be from about 0.0005 to about 0.04 mole of initiator per mole of monomer. For the initiation of carbon-centered anionic polymerization, an inert preferably nonpolar organic solvent can be utilized. Anionic polymerization of cyclic monomers that yield an oxygen-centered anion and lithium cation require either a strong polar solvent such as tetrahydrofuran, dimethyl sulfoxide, or hexamethylphosphorous triamide, or a mixture of such polar solvent with nonpolar aliphatic, cycloaliphatic, or aromatic hydrocarbon solvent such as hexane, heptane, octane, cyclohexane, or toluene.

Generally, the polymerization can be carried out at a temperature ranging from about −78° C. to about 100° C., preferably from about 0° C. to about 60° C. Anhydrous conditions and an inert atmosphere such as nitrogen, helium, or argon are typically required.

Termination of the anionic polymerization is, in general, achieved via direct reaction of the living polymeric anion with protic solvents. Termination with halogen-containing terminating agents, i.e., functionalized chlorosilanes, can produce, for example, vinyl-terminated polymeric monomers. Such terminating agents may be represented by the general formula X—$(Y)_n$—$Si(R)_{3-m}Cl_m$, where m is 1, 2, or 3 and where X, Y, n, and R have been previously defined. Preferred terminating agents are chlorotrimethylsilane or methacryloxypropyldimethylchlorosilane. The termination reaction is carried out by adding a slight molar excess of the terminating agent (relative to the amount of initiator) to the living polymer at the polymerization temperature.

It is recognized that transitioning from a carbon-centered propagating anion to an oxygen-centered propagating anion can be used as a method for terminating an anionic polymerization of vinyl aromatics or conjugated dienes. For example, addition of oxiranes like ethylene oxide to the styrenic anion produced during styrene polymerization can lead to end-capping of the polymer chain with a hydroxyl, oxygen-centered anionic functionality. The reduced nucleophilicity of the oxygen-centered anion prevents further polymerization of any vinyl aromatic or conjugated diene present, thus ethylene oxide acts as a terminating agent in one sense, yet also forms an initiator for further ring-opening polymerizations (as in Hsieh et al., Anionic Polymerization: Principles and Practical Applications, Ch. 5, and 23 (Marcel Dekker, New York, 1996)).

When using alkyl lithium initiators, this disclosure provides a method of preparing the triblock copolymers comprising the steps of a) anionically polymerizing the C block monomer, b) polymerizing the B block monomer, c) end capping with ethylene oxide, d) fully or partially hydrogenating the CB—OH block copolymer, and e) further polymerizing the copolymer of step d) with a ring-opening polymerizable A monomer. The method may be illustrated as follows where R is the residue of the initiator and B* and C* represent the hydrogenated B and C blocks respectively.

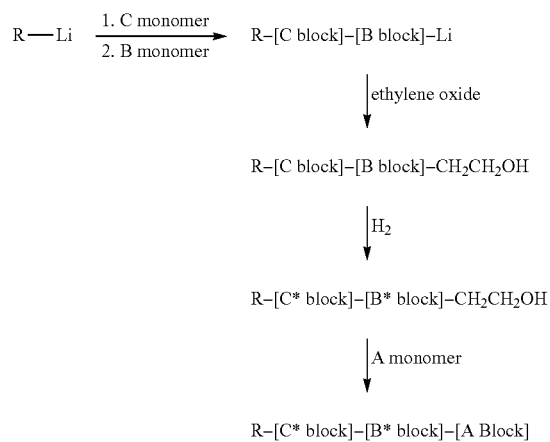

Functional anionic initiators can also be used to provide end-functionalized polymers. These initiators are typically suitable for initiating the recited monomers using techniques known to those skilled in the art. Various functional groups can be incorporated onto the end of a polymer chain using this strategy including: alcohol(s), thiol(s), carboxylic acid, and amine(s). In each of these cases, the initiator must contain protected functional groups that can be removed using post polymerization techniques. Suitable functional initiators are known in the art and are described in, e.g., U.S. Pat. No. 6,197,891 (Schwindeman et al.); 6160054 (Pereira et al.); 6221991 (Letchford et al.); 6184338 (Schwindeman et al.); and 5321148 (Schwindeman et al.); each incorporated herein by reference.

These initiators contain tertiary alkyl or trialkylsilyl protecting groups that can be removed by post-polymerization deprotection. Tert-alkyl-protected groups can also be removed by reaction of the polymer with para-toluenesulfonic acid, trifluoroacetic acid, or trimethylsilyliodide to produce alcohol, amino, or thiol functionalities. Additional methods of deprotection of the tert-alkyl protecting groups can be found in T. W. Greene and P. G. M. Wuts, Protective Groups in Organic Synthesis, Second Edition, Wiley, New York, 1991, page 41. Tert-butyldimethylsilyl protecting groups can be removed by treatment of the polymer with acid, such as hydrochloric acid, acetic acid, or para-toluenesulfonic acid. Alternatively, a source of fluoride ions, for instance tetra-n-butylammonium fluoride, potassium fluoride and 18-crown-6, or pyridine-hydrofluoric acid complex, can be employed for deprotection of the tert-butyldimethylsilyl protecting groups. Additional methods of deprotection of the tert-butyldimethylsilyl protecting groups can be found in T. W. Greene and P. G. M. Wuts, Protective Groups in Organic Synthesis, Second Edition, Wiley, New York, 1991, pages 80-83.

When using a functional initiator, this disclosure provides a method of preparing the triblock copolymer comprising the steps of a) anionically polymerizing the B block monomer using a functionalized initiator, b) polymerizing the C block monomer, c) terminating the polymerization, d) hydrogenating the CB—OR block copolymer, and e) deprotecting and further polymerizing the copolymer of step d) with a ring-opening polymerizable A monomer.

This method may be illustrated as follows:

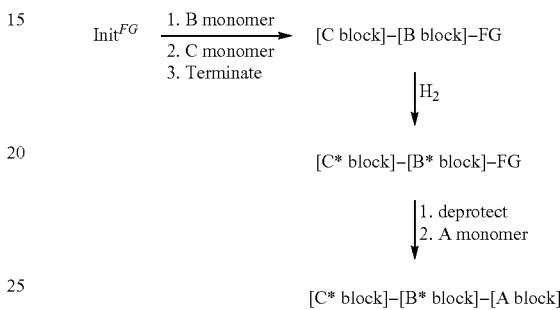

After preparation of the block copolymer, the copolymer is fully or partially hydrogenated to remove sites of unsaturation in both the conjugated diene polymer C block and the vinyl aromatic polymer B block segments of the copolymer. Any method of hydrogenation can be used and such methods typically include the use of metal catalysts supported on an inorganic substrate, such as Pd on $BaSO_4$(U.S. Pat. No. 5,352,744) and Ni on kieselguhr (U.S. Pat. No. 3,333,024) both of which are incorporated herein by reference. Additionally, soluble, homogeneous catalysts such as those prepared from combinations of transition metal salts of 2-ethylhexanoic acid and alkyl lithiums can be used to fully saturate block copolymers, as described in *Die Makromolekulare Chemie*, Volume 160, pp. 291, 1972.

The copolymer hydrogenation can also be achieved using hydrogen and a heterogeneous catalyst such as those described in U.S. Pat. Nos. 5,352,744, 5,612,422 and 5,645,253 which are herein incorporated by reference. The catalysts described therein are heterogeneous catalysts consisting of a metal crystallite supported on a porous silica substrate. An example of a silica supported catalyst which is especially useful in the polymer hydrogenation is a silica which has a surface area of at least 10 $m^2/g$ which is synthesized such that is contains pores with diameters ranging between 3000 and 6000 angstroms. This silica is then impregnated with a metal capable of catalyzing hydrogenation of the polymer, such as nickel, cobalt, rhodium, ruthenium, palladium, platinum, other Group VIII metals, combinations or alloys thereof. Other heterogeneous catalysts can also be used, having average pore diameters in the range of 500 to 3,000 angstroms.

The catalyst may comprise a support on which the catalyst components are deposited. In one embodiment, the metals are deposited on a support such as a silica, alumina or carbon. In a more specific embodiment, a silica support having a narrow pore size distribution and surface area greater than 10 meters squared per gram ($m^2/g$) is used. The pore size distribution, pore volume, and average pore diameter of the support can be obtained via mercury porosimetry following the proceedings of ASTM D-4284-83. Methods of hydrogenating aromatic polymers with so-called "wide pore silica catalysts are described in U.S. Pat. No. 5,700,878 by Hahn and Hucul, incorporated herein by reference.

The hydrogenation reaction can be conducted in the absence of a solvent but is preferably conducted in a hydrocarbon solvent in which the polymer is soluble and which will not hinder the hydrogenation reaction. Preferably the solvent is a saturated solvent such as cyclohexane, methylcyclohexane, ethylcyclohexane, cyclooctane, cycloheptane, dodecane, dioxane, diethylene glycol dimethyl ether, tetrahydrofuran, isopentane, decahydronaphthalene or mixtures thereof, with cyclohexane being the most preferred.

The temperature at which the hydrogenation is conducted can be any temperature at which hydrogenation occurs without significant degradation of the polymer. Degradation of the polymer after hydrogenation can be detected by a decrease in $M_n$, an increase in polydispersity or a decrease in glass transition temperature. Typical hydrogenation temperatures are from about 40° C., preferably from about 100° C., more preferably from about 110° C., and most preferably from about 120° C. to about 250° C., preferably to about 200° C., more preferably to about 180° C., and most preferably to about 170° C.

The pressure of the hydrogenation reaction is not critical, though hydrogenation rates increase with increasing pressure. Typical pressures range from atmospheric pressure to 70 MPa, with 0.7 to 10.3 MPa being preferred. The hydrogenation reaction vessel is purged with an inert gas to remove oxygen from the reaction area. Inert gases include but are not limited to nitrogen, helium, and argon, with nitrogen being preferred.

The total number average molecular weight NO of the hydrogenated BC block copolymers of the present invention is typically from 24,000 g/mol, preferably from 30,000 g/mol, more preferably from 40,000 g/mol, and most preferably from 50,000 g/mol to 150,000 g/mol, typically to 135,000 g/mol, generally to 100,000 g/mol, preferably to 90,000 g/mol, more preferably to 80,000 g/mol, and most preferably to 75,000 g/mol. The $M_n$ is determined by gel permeation chromatography. The molecular weight of the hydrogenated block copolymer and properties obtained are dependent upon the molecular weight of each of the hydrogenated polymeric blocks.

The degree of hydrogenation of the block copolymer is generally measured as a function of the conversion of poly(vinyl aromatic) blocks to poly(cyclohexyl) blocks. Generally greater than 45 percent of the vinyl aromatic block is hydrogenated, preferably greater than 60% is hydrogenated, more preferably greater than 90% is converted as measured by proton NMR. As the conjugated diene C blocks are more readily hydrogenated than the vinyl aromatic B blocks, the conversion of the C blocks will be higher. In some embodiments hydrogenation of the BC block copolymer will yield greater than 45 percent conversion of the vinyl aromatic polymer block segments and greater than 60 percent conversion of the diene polymer block segments. In some embodiments hydrogenation of the BC block copolymer will yield greater than 60 percent of the vinyl aromatic polymer block segments and greater than 75 percent of the diene polymer block segments. In some embodiments, hydrogenation of the BC block copolymer will yield greater than 90 percent of the vinyl aromatic polymer block segments, and greater than 99 percent of the diene polymer. The term 'degree of hydrogenation' refers to the percentage of the original unsaturated bonds which become saturated upon hydrogenation. The degree of hydrogenation for the blocks may be determined by UV-VIS spectrophotometry or by proton NMR.

It will be understood that if the C blocks are chosen from silicon polymers, the BC blocks are subject to the hydrogenation process, but the silicon polymer C blocks are not hydrogenated; i.e., are not reduced as there are no carbon-carbon double bonds to saturate.

Thus, vinyl aromatic units, such as styrene units can be converted to cyclohexyl monomer units, and produce a block copolymer having of a $T_g$ of up to 145° C., depending of the degree of hydrogenation. The hydrogenated block copolymers may be described as having high $T_g$ poly(cyclohexylethyl) B blocks having a $T_g$ of at least 110° C., preferably at least 115° C., and more preferably at least 130° C., and a low $T_g$ "C" block having a $T_g$<25° C., exemplified by poly(ethylene-alt-propylene), poly(ethylene), poly(ethylene-co-butylene), or poly(butylene. The combined B and C blocks comprise 70 to 95 weight percent of the triblock polymeric units. Generally the B blocks of the BC portion of the copolymer comprise between 55 and 75 wt. % of the BC block, preferably about 40 to 70 wt. %. The soft "C" block comprises a total of 10 to 40 weight percent of the triblock polymer and the glassy B block comprises 60 to 90 wt. % of the triblock copolymer.

With each of the synthetic schemes it will be understood that some amount of A, B, C, or BC (co)polymers will also be present in the isolated (co)polymer blend. Generally greater than 50 wt. % of the resulting blend will be the triblock copolymer, as determined by GPC and/or NMR.

The triblock copolymer is melt-processable and can be melted or shaped, for example by extrusion or molding, to produce shaped articles, such as fibers, films and molded articles. By "melt-processable," it is meant that the copolymers are fluid or can be pumped or extruded at the temperatures used to process the articles (e.g. make the fine fibers in blown microfibers), and do not degrade or gel at those temperatures to the extent that the physical properties are so poor as to be unusable for the intended application.

Shaped articles (e.g., fibers, films and molded or extruded articles) of this invention can be made, e.g., by melt extruding the triblock copolymer into shaped articles such as pellets, fibers, or films by known methods. The triblock polymer composition is especially useful in the preparation of nonwoven fabrics used in filtration applications. Films made from triblock compositions are useful, for example, for packaging, release liners, and multilayer constructions.

After melt extrusion of a fiber, film or extruded article, an annealing step may be carried out to enhance migration of the A or B/C block to the surface with a resultant increase in hydrophilicity, tackiness, and/or adhesion. For example, the fiber or film is annealed at a temperature, under elevated humidity, and for a time sufficient to increase the amount of A block at the surface. Effective time and temperature will bear an inverse relationship to one another and a wide variety of conditions will be suitable.

The triblock copolymer composition is also useful in preparing blown microfibers for non-woven fabrics having thermoelastic properties, hydrophilicity, toughness, and/or phase-separated features. The non-woven webs of fibers of triblock copolymer may be prepared by any of the commonly known processes for producing non-woven webs. For example, the fibrous non-woven web can be made by spunbonding techniques or melt-blowing techniques or combinations of the two. Spunbonded fibers are typically small diameter fibers which are formed by extruding molten thermoplastic polymer as filaments from a plurality of fine, usually circular capillaries of a spinneret with the diameter of the extruded fibers being rapidly reduced. Meltblown fibers are typically formed by extruding the molten thermoplastic material through a plurality of fine, usually circular, die capillaries as molten threads or filaments into a high velocity, usually heated gas (e.g. air) stream which attenuates the filaments of molten thermoplastic material to reduce their diameter. Thereafter, the meltblown fibers are carried by the high velocity gas stream and are deposited on a collecting surface to form a web of randomly disbursed meltblown fibers The melt blown fibers can be prepared as described in Van Wente, A., "Superfine Thermoplastic Fibers," Industrial Engineering Chemistry, vol. 48, pp. 1342-1346 (1956) and in Report No. 4364 of the Naval Research Laboratories, published May 25, 1954, entitled "Manufacture of Super Fine Organic Fibers" by Van Wente et al. or from microfiber webs containing particulate matter such as those disclosed, for example, in U.S. Pat. No. 3,971,373 (Braun), U.S. Pat. No. 4,100,324 (Anderson) and U.S. Pat. No. 4,429,001 (Kolpin et al.).

Multilayer constructions of nonwoven fabrics enjoy wide industrial and commercial utility and include uses such as fabrics for medical gowns and drapes. The nature of the constituent layers of such multilayer constructions can be varied according to the desired end use characteristics, and can comprise two or more layers of melt-blown and spunbond webs in many useful combinations such as described in U.S. Pat. Nos. 5,145,727 and 5,149,576, incorporated herein by reference. The filtering efficiency of a melt-blown microfiber web can be improved by a factor of two or more when the melt-blown fibers are bombarded as they issue from the orifices with electrically charged particles such as electrons or ions, thus making the fibrous web an electret. Similarly, the web can be made an electret by exposure to a corona after it is collected.

Any of a wide variety of constructions, especially multilayer constructions such as SMS (spunbond/meltblown/spunbond) constructions, may be made from the above-described fibers and fabrics, and such constructions will find utility in any application where some level of hydrophobicity, oleophobicity (or other fluid repellency, such as to bodily fluids) is required. The fibers prepared from the triblock copolymer composition of the invention may be used in woven and nonwoven medical fabrics (such as drapes, gowns and masks), industrial apparel, outdoor fabrics, and in a myriad of other related uses. Films prepared from the composition of this invention can be made which are useful, for example, for packaging, release liners and microporous film applications. These films can be used to make multilayer constructions in which one, more than one, or all layers contain the triblock copolymer.

EXAMPLES

General Considerations:

Polymer synthesis and reagent purifications were conducted in a MBraun Labmaster SP glovebox or in custom glassware designed to enable anionic polymerizations (for examples see Ndoni, S.; Papadakis, C. M.; Bates, F. S.; Almdal, K. Laboratory-scale Setup for Anionic Polymerization under Inert Atmosphere. Review of Scientific Instruments 1995, 66 (2), 1090-1095 DOI: 10.1063/1.1146052). Standard air-free techniques were used for anionic polymerization and reagent manipulations. Hydrogenations were conducted in a Parr series 4530/40/50 (rated to 1900 pounds per square inch (psi) (13.1 MPa)) 2 liter (L) stirred reactor with temperature control. Reagents and corresponding suppliers are listed below in Table 1.

TABLE 1

Experiment materials, source and vendor product codes.

| Abbreviation or Trade Name | CAS #/ Product Code | Description |
| --- | --- | --- |
| Isoprene | L14619 | Available from Alfa Aesar., Ward Hill, Massachusetts. |
| Styrene | S4972 | Reagent plus, >99%, available from Sigma-Aldrich Co. LLC., St. Louis, Missouri. |
| TBDMSPL | — | Tert-butyl-dimethylsiloxy-propyl-1-lithium, 1.04M in cyclohexane, available from FMC Lithium, Charlotte, North Carolina. |
| Rac-lactide | M700 | Monomer available from NatureWorks LLC, Minnetonka, Minnesota. |
| Benzene | BX0212-6 | OMNISOLV Benzene, available from EMD Millipore, Billerica, Massachusetts. |
| THF | 401757 | Tetrahydrofuran, anhydrous, ≥99.9%, inhibitor-free. Available from Sigma-Aldrich Co. LLC., St. Louis, Missouri. |
| DBU | A12449 | 1,8-Diazabicyclo[5.4.0]undec-7-ene, 99%, available from Alfa Aesar, Ward Hill, Massachusetts. |
| TBAF | 216143 | Tetrabutylammonium Fluoride, 1.0M in THF, available from Sigma-Aldrich Co. LLC., St. Louis, Missouri. |
| Ethylene oxide | 387614 | Ethylene oxide, ≥99.5%, available from Sigma Aldrich Co. LLC., St. Louis, Missouri |
| Sec-BuLi | 718-01 | 12 wt % sec-butyllithium in cyclohexane, available from FMC Lithium, Charlotte, North Carolina. |

TABLE 1-continued

Experiment materials, source and vendor product codes.
Materials

| Abbreviation or Trade Name | CAS #/ Product Code | Description |
|---|---|---|
| Dibutyl-magnesium | 345113 | 1.0M di-n-butylmagnesium solution in heptane, available from Sigma Aldrich Co. LLC., St. Louis, Missouri. |
| Silica gel | 545524 | Silica gel, 60 Angstrom, 200-425 mesh, available from Sigma-Aldrich Co. LLC., St. Louis, Missouri. |
| Methanol | MX0480-6 | OMNISOLV Methanol, available from EMD Millipore, Billerica, Massachusetts. |
| Pd on $CaCO_3$ | 11723 | Palladium hydrogenation catalyst, 5% by mass on calcium carbonate powder (reduced), available from Alfa Aesar, Ward Hill, Massachusetts. |
| Potassium | 679909 | Potassium, cubes (in mineral oil), L × W × H 40 mm × 30 mm × 20 mm, 99.5% trace metals basis. Available from Sigma Aldrich Co. LLC., St. Louis, Missouri. |
| Naphthalene | 33347 | Naphthalene, 99.6%, available from Alpha Aesar, Ward Hill, Massachusetts. |
| Diphenylethylene | A14434 | 1,1-Diphenylethylene, 98%, available from Alfa Aesar, Ward Hill, Massachusetts. |
| $CH_2Cl_2$ | DX0831-1 | Dichloromethane, Omnisolve, available from EMD Millipore, Billerica, Massachusetts. |
| $CaH_2$ | 21170 | Calcium hydride, available from Sigma Aldrich Co. LLC., St. Louis, Missouri |
| Ethyl acetate | EX0241-1 | Ethyl acetate, Omnisolve, available from EMD Millipore, Billerica, Massachusetts. |
| n-BuLi | 186171 | n-butyllithium, 1.6M in hexanes, available from Sigma Aldrich Co. LLC., St. Louis, Missouri. |
| Isopropanol | BDH1133-4LP | Isopropanol, BDH, available from VWR, Radnor, Pennsylvania. |
| Diatomaceous earth | CX0574 | Diatomaceous earth available under the trade name CELITE from available from EMD Millipore, Billerica, Massachusetts. |
| Toluene | 244511 | Toluene, anhydrous, available from Sigma Aldrich Co. LLC., St. Louis, Missouri. |
| Sn (II) catalyst | S3252 | Tin (II) ethylhexanoate, available from Sigma Aldrich Co. LLC., St. Louis, Missouri. |

Reagent Drying

Benzene was degassed by bubbling with argon (Ar) for longer than one hour before being cannula-transferred to a Strauss flask containing degassed 1,1-diphenylethylene. Sec-BuLi was then added under Ar counterflow via syringe, causing a very gradual color change from light yellow to deep, wine red over the course of an hour. After stirring overnight, benzene was vacuum transferred to an addition funnel. $CH_2Cl_2$ was dried over $CaH_2$, degassed with three freeze-pump-thaw cycles, and vacuum-transferred into a receiving flask. Styrene was stirred over $CaH_2$ overnight, degassed with three freeze-pump-thaw cycles, and then vacuum-transferred into a Schlenk bomb containing dried dibutyl-magnesium. After stirring overnight in an Ar atmosphere, styrene was again vacuum-transferred into a receiving flask to afford a final, dry monomer. Isoprene was dried as detailed above with sequential vacuum transfers from $CaH_2$ and dibutyl-magnesium. Rac-lactide was recrystallized from ethyl acetate and dried overnight under high vacuum.

Ethylene oxide was condensed in a receiving flask cooled with liquid nitrogen, degassed by at least three freeze-pump-thaw cycles taking care not to warm the ethylene oxide above its boiling point (10.7° C.), vacuum transferred to a flask containing n-butyllithium (solvent removed in vacuo) and stirred at 0° C. for at least 30 min, vacuum transferred to a second flask containing n-BuLi (solvent removed in vacuo) and stirred at 0° C. for at least an additional 30 min, and finally vacuum transferred to a flame dried monomer flask suitable for connection to the polymerization reactor.

Palladium hydrogenation catalyst (5% on calcium carbonate, reduced) was placed in a Schlenk bomb and exposed to high vacuum at room temperature overnight. The next morning, while under dynamic vacuum, the Schlenk bomb was placed in a 100° C. oil bath for approximately 90 minutes, but not longer than two hours. The catalyst was activated and used in this manner.

All other chemicals were used as received.

Gel Permeation Chromatography (GPC)

Tetrahydrofuran (THF, stabilized with 250 parts per million (ppm) butylated hydroxytoluene (BHT)) was used for the solvent and mobile phase. Solutions of known concentration were prepared in glass scintillation vials; the target concentration was ≈5.0 milligrams/milliliter (mg/mL). The vials were swirled for at least 4 hours in order to allow dissolution. The solutions were then filtered using 0.2 micrometer (μm) polytetrafluoroethylene (PTFE) syringe filters. The GPC conditions were the following:
Instrument: Agilent 1260 LC
Column set: Agilent Pgel MIXED A, 300 millimeter (mm) length×7.5 mm inner diameter (I.D.)
Agilent Plgel MIXED B, 300 mm length×7.5 mm I.D
Col. Heater: 40° C.
Mobile phase: THF, stabilized with 250 ppm BHT at 1.0 milliliters/minute (mL/min)
Injection volume: 40 microliters (μL)
Detector (s): Wyatt DAWN HELEOS-II 18 angle Light Scattering detector
Wyatt ViscoStar II viscometer detector
Wyatt Optilab rEX Differential Refractive Index (DRI) detector
ASTRA 6 from Wyatt Technology Corporation was used for data collection and analysis. A narrow standard of polystyrene of 30 kilograms/mole (kg/mol) was used for normalization of the light scattering detectors and for measuring the inter-detector volume.
Nuclear magnetic resonance (NMR)
$^1$HMR spectra were recorded on Bruker Avance III 500 MHz NMR spectrometer and calibrated with reference to solvent resonance (residual CHCl$_3$ in CDCl$_3$, 7.24 ppm).
Measurement of the Glass Transition Temperature by Differential Scanning Calorimetry (DSC)
The glass transition temperature, $T_g$, of the constituent blocks of the synthesized block copolymers was measured by differential scanning calorimetry (DSC) on a TA Instruments Q2000 or Q200 DSC. Block copolymer powder was loaded into DSC pans and subjected to the following thermal treatment: equilibrate at 40° C., heat at 10° C./min to 180 or 200° C., cool at 5 or 10° C./min to −85° C. or −80° C., heat to 200° C. at 10° C./min. The Tg was determined as the inflection point in the heat flow curve at the step change in heat flow that accompanies the glass transition during the second heating segment. Melting temperatures of, $T_m$, of materials containing poly(ethylene oxide) (PEO) was determined as the temperature at the extremum of the melting peak in the heat flow signal during the second heating cycle.

Preparatory Example 1: TDBMS-Terminated Poly(Isoprene-Block-Styrene) Block Copolymer (IS—OR)

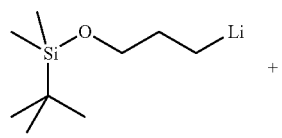

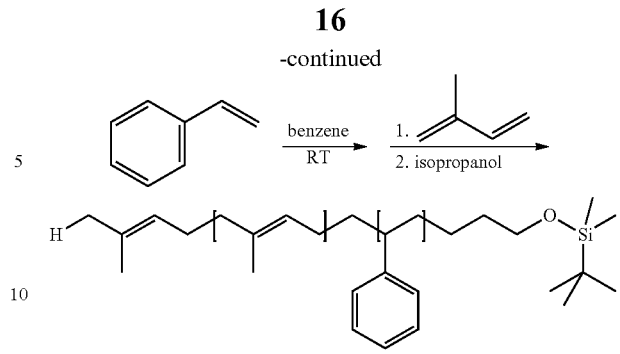

In the glovebox, benzene (approximately 600 mL) and styrene (43.60 grams (g), 419 millimole (mmol)) were added to 1 L Schlenk flask with stirbar. Under vigorous stirring, protected initiator TBDMSPL (0.63 mL, 0.63 mmol) was rapidly injected with a syringe. The color of the reaction slowly changed color from colorless to orange over the course of 15 minutes. The polymerization was allowed to stir at room temperature in the glovebox for 48 hours. Isoprene (21.10 g, 309 mmol) was then added, causing the reaction to rapidly change color to pale yellow. The polymerization was stirred for an additional 24 hours over which time it became more viscous.

The polymerization was quenched with degassed isopropanol 24 hours after the introduction of isoprene. The polymer was then dried under reduced pressure and redissolved in approximately 400 mL THF. The polymer was isolated by precipitation from cold methanol. The polymer was once again dried, dissolved, and precipitated for a total of 2 precipitations to afford a white, dense solid.

The polymer composition was determined by $^1$H-NMR. Polymer molecular weight and dispersity were determined by GPC

TABLE 2

Summary of GPC and $^1$H-NMR characterization for a series of IS-OR block polymers.

| Sample | Mass % Isoprene | Mass % Styrene | Mw Final Product (kg/mol) | IS-OR Polydispersity (PDI) |
|---|---|---|---|---|
| PE-1A | 36.0 | 64.0 | 88.2 | 1.01 |
| PE-1B | 33.5 | 66.5 | 101.0 | 1.01 |
| PE-1C | 33.5 | 66.5 | 126.0 | 1.01 |
| PE-1D | 34.8 | 65.2 | 132.6 | 1.01 |

Preparatory Example 2: Hydrogenation of IS—OH Block Copolymers: Synthesis of PEP-PCHE-OH

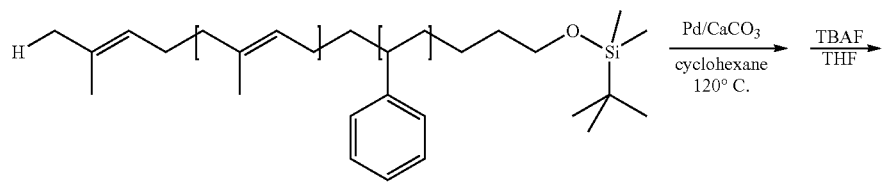

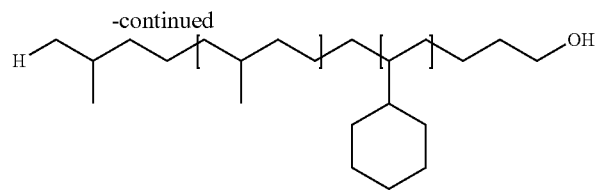

In the glovebox, polymer (58.0 g, PI—PS—OR, PE-1B) was added to a 1 L jar with a stirbar. Cyclohexane was then added (approximately 750 mL) and the polymer solution stirred overnight to dissolve. The next day, Pd/CaCO$_3$ catalyst (7.5 g) was introduced into the polymer solution and suspended under vigorous stirring. The polymer solution was sealed and brought out of the glovebox. A clean 2 L Parr reactor was fitted with a glass insert and placed under an Ar gas sparge. The polymer solution was then quickly added to the reactor with Ar sparging before being sealed.

Once sealed, the reactor was placed under a hydrogen atmosphere by four cycles of pressurizing (200 psi, 1.38 MPa) and venting while stirring and monitoring with a hydrogen sensor. After a hydrogen atmosphere had been established, the reactor was pressurized to 500 psi (3.45 MPa) and left for 1 hour to check for leaks. The reactor was then vented to 200 psi (1.38 MPa) and heating to 120° C. was initiated while vigorously stirring. Once a temperature of 120° C. had been reached, the reactor was pressurized to 500 psi (3.45 MPa) with hydrogen. Hydrogenation occurred over the next five days as approximately 640 psi (4.41 MPa) of hydrogen was consumed; hydrogen was periodically added to maintain a pressure above 420 psi (2.90 MPa). After five days, the reactor was cooled to room temperature before being vented. Once vented, the reactor was opened and approximately 200 mL of cyclohexane was added to the suspension. The polymer solution was filtered (with difficulty) through diatomaceous earth (available under the trade name CELITE from Sigma Aldrich Co. LLC, St. Louis, Mo.) to give a clear, water-white solution. This solution was then reduced to dryness on the rotovap. Once dried, the polymer was redissolved in approximately 400 mL THF. TBAF (5.0 mL, excess, 1.0 M in THF) was added and the solution stirred at room temperature under Ar for 18 hours. Occasionally, the polymer solution will change color slightly to light yellow. After 18 hours, the polymer solution was passed through silica gel to remove excess TBAF; additional THF was added to induce filtration. The solution was once again reduced in volume on the rotovap to approximately 400 mL and the polymer was precipitated by addition to cold methanol. A fine white solid resulted which was isolated by filtration. The polymer was dried in a vacuum oven at 60° C. overnight.

The polymer composition was determined by $^1$H-NMR. Polymer molecular weight and dispersity were determined by GPC. Results for additional hydrogenations are displayed below.

TABLE 3

Summary of GPC and $^1$H-NMR characterization for a series of PEP-PCHE-OH block polymers.

| Sample | Starting Material Mass % Isoprene | Starting Material Mass % Styrene | Mw Final Product (kg/mol) | Product PDI | % Conversion |
|---|---|---|---|---|---|
| PE-2A | 36.0 | 64.0 | 85.8 | 1.03 | ~50% |
| PE-2B | 33.5 | 66.5 | 100.2 | 1.01 | >95% |
| PE-2C | 33.5 | 66.5 | 130.1 | 1.01 | >95% |
| PE-2D | 34.8 | 65.2 | 135.9 | 1.01 | >95% |

Example 1: Addition of L-Lactide to Form PEP-PCHE-(L-PLA)

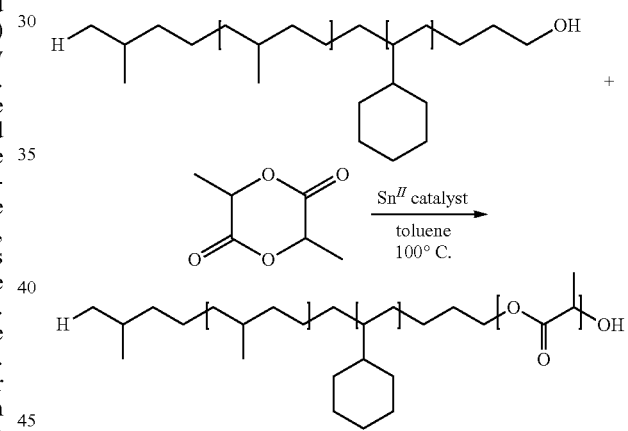

In the glovebox, PEP-PCHE-OH (PE-2B, 14.3 g) was added to a 150 mL glass pressure vessel equipped with a glass stirbar. Toluene (108 mL) was then added and the solution stirred until the polymer was completely dissolved. L-lactide (9.3 g, 65 mmol) was then added followed by addition of a toluene Sn(II) catalyst solution (445 µL, 64.97 mg, 0.160 mmol tin(II) ethylhexanoate) resulting in a clear suspension. The flask was then sealed and brought out of the glovebox. The pressure vessel was then placed in an oil bath preheated to 105° C.

After 130 minutes, the pressure vessel was placed in an ice bath to halt further polymerization. The reaction was then precipitated from isopropanol to give a stringy white solid. The solid was dried, redissolved in approximately 40 mL THF, and precipitated once more from methanol. After drying overnight at 60° C. under high vacuum, NMR and GPC data were collected. The polymer composition was determined by $^1$H-NMR. Polymer molecular weight and dispersity were determined by GPC.

TABLE 4

Summary of GPC and ¹H-NMR characterization for a series of PEP-PCHE-(L-PLA) block polymers.

| Sample | Starting Material | Mass % PEP-PCHE | Mass % (L-PLA) | Mw (kg/mol) | Product PDI |
|---|---|---|---|---|---|
| EX-1A | PE-2A | 76.0 | 24.0 | 100 | 1.11 |
| EX-1B | PE-2A | 85.0 | 15.0 | 94.0 | 1.17 |
| EX-1C | PE-2B | 72.9 | 27.1 | 127 | 1.02 |
| EX-1D | PE-2C | 66.7 | 33.3 | 165 | 1.05 |
| EX-1E | PE-2B | 65.7 | 34.3 | 139 | 1.03 |

TABLE 5

Summary of DSC characterization for a series of PEP-PCHE-PEO block polymers.

| Sample | $T_g$, PCHE (° C.) | $T_g$, PEP (° C.) | $T_m$, PLA (° C.) |
|---|---|---|---|
| EX-1A | 117 | −56 | 57 |
| EX-1E | 140 | −58 | 58 |

Example 2: Addition of Ethylene Oxide to Form PEP-PCHE-PEO

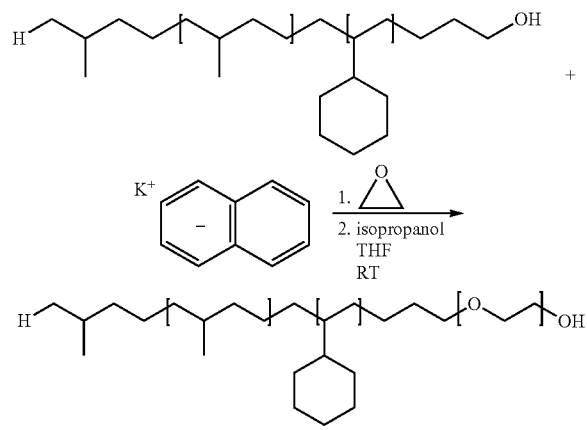

A 1 L custom glass polymerization reactor was constructed with connections to a manifold apparatus containing a septum port, a valve for connection to a vacuum/Ar Schlenk line, and a valve for connection to a pressure gauge to monitor reactor pressure; with an airlock apparatus that facilitates the air free connection of flasks to the reactor during polymerization reactions for introduction of additional reagents through a connection to a vacuum/Ar Schlenk line and a series of valves; and with a flask containing 268 g of dry THF solvent. The reactor was flame dried and an air free and moisture free inert Ar atmosphere was established by repeated (at least 5) cycles of evacuation followed by refilling with Ar to a pressure of approximately 3 psi (20.7 KPa). 16.1 g PEP-PCHE-OH diblock copolymer (PE-2B) was dissolved in approximately 100 mL benzene and added to the reactor via a funnel with Ar counterflow. The reactor was then sealed under a positive (approximately 3 psi (20.7 KPa)) Ar atmosphere and the polymer solution was frozen by submerging the reactor in liquid nitrogen. The frozen benzene solvent was then removed by evacuating the reactor and freeze drying overnight. The reactor containing the freeze dried polymer was again flame dried (avoiding areas containing polymer) and an inert air free and moisture free Ar atmosphere was established by repeated (at least 5) cycles of evacuation followed by refilling with Ar to a pressure of approximately 3 psi (20.7 KPa). The reactor was then pressurized with Ar (approximately 3 psi (20.7 KPa)), sealed, and the THF solvent was drained into the reactor. The solution was stirred to dissolve the polymer and heated to 45° C. via an oil bath.

A potassium naphthalenide initiator solution was prepared by adding dry THF solvent (109 g) and naphthalene (1.80 g; a 10% molar excess relative to potassium metal) to freshly cut and washed potassium metal (0.5 g). The reagents were stirred under an Ar atmosphere for at least 24 hours to yield a dark green solution.

The potassium naphthalenide solution in THF was collected in a gas tight syringe and slowly added to the reactor via the septum port. Potassium naphthalenide was added to the stirring reaction solution until a pale green color persisted for at least 30 minutes, indicating the endpoint of the titration. A flask containing ethylene oxide (3.2 g, 73 mmol) maintained at 0° C. in an ice water bath was connected to the airlock apparatus via a stainless steel flexible hose. An air free and moisture free Ar atmosphere was established in the airlock apparatus by repeated (at least 5) cycles of evacuation followed by refilling with Ar to a pressure of approximately 3 psi (20.7 KPa) via a connection to a vacuum/Ar Schlenk line. The airlock apparatus was then sealed from the Schlenk line, opened to the reactor, and the ethylene oxide monomer was slowly added to the reactor. The reactor pressure was monitored during the addition to prevent over pressurization of the reactor as the ethylene oxide boiled into the reactor headspace and slowly dissolved in the THF solvent. After addition of the ethylene oxide to the reactor, the reaction was allowed to proceed for approximately 72 hours prior to termination with degassed methanol added via a cannula transfer through the septum port of the reactor.

To isolate the solid polymer, the THF solvent was removed by rotary evaporation and the resulting polymer was dissolved in 400 mL of $CH_2Cl_2$ and washed with several (at least 3) 400 mL aliquots of distilled water. The $CH_2Cl_2$ solvent was removed by rotary evaporation and the resulting polymer was redissolved in 150 mL of benzene, poured into a beaker, frozen in liquid nitrogen, and freeze dried in a vacuum oven to yield approximately 16.9 g of off-white polymer.

The polymer composition was determined by ¹H-NMR. Polymer molecular weight and dispersity were determined by GPC.

TABLE 6

Summary of GPC and ¹H-NMR characterization for a series of PEP-PCHE-PEO block polymers.

| Sample | Starting Material | Mass % PEP-PCHE | Mass % (PEO) | Mw (kg/mol) | Product PDI |
|---|---|---|---|---|---|
| EX-2A | PE-2B | 85.0 | 15.0 | 127 | 1.02 |
| EX-2B | PE-2C | 90.0 | 10.0 | 150.0 | 1.01 |
| EX-2C | PE-2C | 87.4 | 12.6 | 155.0 | 1.03 |

TABLE 7

Summary of DSC characterization for a
series of PEP-PCHE-PEO block polymers

| Sample | $T_g$, PCHE (° C.) | $T_g$, PEP (° C.) | $T_m$, PEO (° C.) |
|---|---|---|---|
| EX-2A | 144 | −59 | 55 |
| EX-2B | 146 | −58 | 46 |
| EX-2C | 148 | −59 | 51 |

What is claimed is:

1. A triblock copolymer of the formula ABC wherein
B is a hydrogenated vinyl aromatic block having a $T_g$ of ≥110° C. and comprising 30-90 wt. % of the copolymer;
C is a rubbery block having a $T_g$≤25° C. and comprising 10-70 wt. % of the copolymer; and
A is an block derived from ring-opening polymerization, substantially incompatible with both B and C blocks wherein B+C comprises 70-95 wt. % of the copolymer.

2. The triblock copolymer of claim 1 wherein A comprises 5-30 wt. % of the copolymer.

3. The triblock copolymer of claim 1 wherein the B block comprises 60-90 wt. % of the copolymer.

4. The triblock copolymer of claim 1 wherein the C block comprises 10-40 wt. % of the copolymer.

5. The triblock copolymer of claim 1 wherein the weight ratio of the B block to the C block is 2:1+/−25%.

6. The triblock copolymer of claim 1 wherein the B block is selected from hydrogenated styrene, α-methylstyrene, 4-methylstyrene, 3-methylstyrene, 4-ethylstyrene, 3,4-dimethylstyrene, 2,4,6-trimethylstyrene, 3- tert-butyl-styrene, 4-tert-butylstyrene, 4-methoxystyrene, 4-trimethylsilylstyrene, 2,6-dichlorostyrene, vinyl naphthalene, 4-chlorostyrene, 3-chlorostyrene, 4-fluorostyrene, 4-bromostyrene, vinyl toluene, ethylstyrene, diethyl styrene, di-n-butylstyrene, isopropylstyrene, other alkylated-styrenes, styrene analogs, vinyl naphthalene, and vinyl anthracene.

7. The triblock copolymer of claim 1 wherein the C block is selected from hydrogenated butadiene, isoprene, ethylbutadiene, phenylbutadiene, piperylene, pentadiene, hexadiene, ethylhexadiene, and dimethylbutadiene 1,3-cyclodiene monomers, such as 1,3-cyclohexadiene, 1,3-cycloheptadiene and 1,3-cyclooctadiene, preferably 1,3-cyclohexadiene, and mixtures thereof.

8. The triblock copolymer of claim 1 wherein C is a organopolysiloxanes having recurring units of)-[Si($R^{10}$)$_2$—O]— wherein each $R^{10}$ denotes an organic radical, e.g., alkyl, cycloalkyl or aryl.

9. The triblock copolymer of claim 1 wherein A is derived from ring-opening anionic polymerization of cyclic monomers selected from oxiranes (epoxides), cyclic sulfides, lactones, lactides, cyclic carbonates, lactams and aziridines.

10. The triblock copolymer of claim 1 wherein the A block comprises polyesters selected from poly(lactic acid), poly (glycolic acid), poly(lactic-co-glycolic acid), polybutylene succinate, polyhydroxybutyrate, polyhydroxyvalerate, derived from ring opening polymerization of lactones.

11. The triblock copolymer of claim 1 wherein the A block are polyethers selected from poly(ethylene oxide), poly (propylene oxide), poly(ethoxyethyl-glycidylether), poly(vinylglycidylether), poly(methylglycidylether), poly(ethylglycidylether), poly(propylglycidylether), poly (butylglycidylether), glycidol, and copolymers thereof derived from ring-opening polymerization of cyclic ethers.

12. The triblock copolymer of claim 1 where A is derived from alternating copolymerization of carbon dioxide and oxiranes.

13. The triblock copolymer of claim 1 wherein the $M_n$ is >60 kDa.

14. The triblock copolymer of claim 1 wherein the $M_n$ is 60-500 kDa.

15. Polymer blends comprising the triblock copolymer of claim 1 and an A, B, C, or BC (co)polymer.

16. The polymer blends of claim 15 wherein the triblock copolymer comprises >50 wt. % of the polymer blend.

17. A method of preparing the triblock of claim 1 comprising the steps of
a) anionically polymerizing the C block monomer, b) polymerizing the B block monomer, c) end capping the resulting copolymer with ethylene oxide to produce a copolymer of the formula CB—OH, d) hydrogenating the CB—OH block copolymer, and e) further polymerizing the copolymer of step d) with a ring-opening polymerizable monomer to produce the desired CBA block copolymer.

18. A method of preparing the triblock of claim 1 comprising the steps of a) anionically polymerizing the B block monomer using a functionalized initiator to produce an intermediate block copolymer of the formula B—OR, b) polymerizing the C block monomer to produce an intermediate block copolymer of the formula CB—OR, c) terminating the polymerization, d) hydrogenating the CB—OR block copolymer, and e) deprotecting to OR group and further polymerizing the copolymer of step d) with a ring-opening polymerizable monomer.

19. A shaped article comprising the triblock copolymer of claim 1.

20. The shaped article of claim 19 comprising films, sheet and fibers.

* * * * *